United States Patent
Bailey

(10) Patent No.: US 6,246,141 B1
(45) Date of Patent: Jun. 12, 2001

(54) HIGH TORQUE REDUCED STARTING CURRENT ELECTRIC MOTOR

(75) Inventor: Mark W. Bailey, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/298,712

(22) Filed: Apr. 23, 1999

(51) Int. Cl.⁷ .................. H02K 17/16; H02K 17/18
(52) U.S. Cl. .................. 310/211; 310/212; 310/261
(58) Field of Search .................. 310/125, 211, 310/212, 261

(56) References Cited

U.S. PATENT DOCUMENTS

| | | | |
|---|---|---|---|
| 1,678,912 | * 7/1928 | McLeod et al. | 310/211 |
| 2,419,863 | * 4/1947 | Ware | 310/211 |
| 2,486,798 | * 11/1949 | Mollenhauer | 310/211 |
| 3,936,685 | * 2/1976 | Glockner et al. | 310/209 |
| 4,970,424 | * 11/1990 | Nakamura et al. | 310/262 |
| 5,068,560 | * 11/1991 | Lundquist | 310/125 |
| 5,185,918 | * 2/1993 | Shafer | 310/45 |
| 5,349,742 | * 9/1994 | Nolle | 310/211 |
| 5,719,457 | * 2/1998 | Helfer | 310/211 |

* cited by examiner

*Primary Examiner*—Burton Mullins
(74) *Attorney, Agent, or Firm*—Lawrence E. Crowe

(57) ABSTRACT

An AC squirrel cage motor runs with a rotor current frequency equal to the slip of the motor times its excitation frequency. It is desirable to reduce the rotor current on start up by means of an increased resistance, and then to run the motor with a reduced resistance once it is started. This invention takes advantage of the skin effect of high frequency currents by increasing rotor end ring resistance during startup. After the motor has started up, and has reached full speed, the rotor frequency is reduced to merely the slip multiplied by the stator frequency. The skin effect on the rotor current is less, and the motor runs with reduced resistance.

5 Claims, 6 Drawing Sheets

HIGH TORQUE REDUCED STARTING CURRENT ELECTRIC MOTOR

FIELD OF THE INVENTION

This invention relates to the field of AC induction motors with squirrel-cage rotors and in particular to an AC induction motor with high starting torque and reduced start-up current that does not increase the resistance of the rotor during the normal operation of the motor.

BACKGROUND

When an AC induction motor with a squirrel-cage rotor starts up, power is applied to the stator windings. The power sets up an electric field that rotates about the stator, generates a rotating magnetic field about the rotor, and urges the rotor into motion. When the motor is running at full speed, the speeds of the stator and rotor fields differ by a small amount called slip. The slip is usually a few percent of the stator frequency, and this difference is the rotor frequency. At start-up, however, the rotor is at rest, and the difference is the full amount of the stator frequency. Thus at start-up, stator and rotor currents can reach five or six times their normal operating values. The power applied to the stator circulates in the stator windings, while resulting rotor currents circulate in rotor bars and end rings (a "squirrel-cage") placed into the rotor. FIG. 1 shows the general arrangement of an AC induction motor, while FIG. 2 depicts a "squirrel-cage" rotor.

The very high currents at start up can damage or destroy starting equipment, and constitute a great burden on a plant's electrical equipment and ultimately on electric utilities. A variety of methods have been used to reduce starting currents. The problem can be solved by means of external electrical controls. A motor can be started at reduced voltage, or a "soft-start" control algorithm can be employed. These methods are not suitable for starting up loads requiring high start-up torque. A solution that adapts the motor hardware itself would be self-contained, reliable, and would not involve extra external circuits or controls.

Motors may take advantage of the skin effect of electricity by increasing rotor resistance during startup or reducing rotor resistance after startup. The skin effect teaches that electricity of high frequency flows only in an outer skin of a conductor, while electricity of low frequency can penetrate conductors and more fully utilize the conductors available. At start-up, rotor frequency is high, and the skin effect limits the penetration of rotor currents into the rotor bars and end rings. Once the motor is started, however, rotor frequency is low, and the full depth of a conductor is available to rotor currents. Previous attempts to use the skin effect to reduce start-up current and increase locked rotor torque have mainly involved the details of the rotor slots. Other non-electromagnetic methods for lowering startup current and increasing locked rotor torque are mechanically involved and add parts and complexity to the motor.

Engineers have tried varied ways to solve the problem of high start-up current by increasing the resistance on start up or by lowering resistance during running. Thus, Higashi, U.S. Pat. No. 4,885,494, proposes starting up an induction motor, and then filling spaces in the rotor with liquid nitrogen to achieve superconductivity once the motor is running. While this method achieves the desired result, it is not practical. Other methods with mechanical complexity are shown in Plumer, U.S. Pat. No. 4,720,647, Lundquist, U.S. Pat. No. 5,068,560, and Gupta, U.S. Pat. No. 5,751,082. These methods depend on the increased speed and rotational inertia of the motor after startup to force greater masses of conductive material into contact with the end rings, through springs or flyweights. These methods have the double disadvantage of mechanical complexity and decreased performance when the motor becomes old, hot and dirty.

Tapered end rings have been used for several reasons, as in Lundquist, U.S. Pat. No. 5,068,560, Hibino, U.S. Pat. No. 5,182,483, and Shafer, U.S. Pat. No. 5,185,918. In Lundquist, end rings of tapered cross section are used for mating parts to one another, and possibly for ease of manufacture. Hibino casts rotor bars into the rotor stack, and likely uses a slight draft angle on the end rings in order to remove the cast rotor from the casting tool. Shafer uses tapered rotor bars, and subsequently squares them up by plasma spraying end rings onto the rotor bars. None of these methods use a designed, controlled taper to significantly reduce rotor currents and increase locked rotor torque on start up.

Various types of rotor slot designs attempt to use the flux leaking across the rotor slots as a device to increase rotor resistance during startup. The phenomenon is documented in places such as the Louis Allis Pacemaker® motor catalog, in their explanation of NEMA motor design types. Such a design crowds the rotor current toward the outside diameter of the rotor during startup. As the rotor speed increases the current begins to penetrate deeper into the bar. This electromagnetic effect occurs in "deep bar" type rotors and "double cage" type rotors.

Double cage rotors attempt to increase resistance on startup, as shown in Marks Standard Handbook for Mechanical engineers, $7^{th}$ ed. (1967) at 15–63, and Neumann, U.S. Pat. No. 4,831,301. These motors use an outer squirrel cage of higher resistance material, such as brass, and an inner squirrel cage of low resistance material, such as copper. Upon startup, the skin effect limits rotor currents by means of the high resistance brass material in the outer cage, while afterwards, the skin effect is lessened, and the rotor current can penetrate the rotor to take advantage of the copper cage, lowering resistance during normal operation. A "double cage" rotor may be considered as merely a very complex shaped "deep bar" type rotor. The disadvantage of this construction is the extra labor, expense and inconvenience of two different types of rotor bar material. What is needed is a construction that reduces rotor current on start up without added parts or complexity.

SUMMARY

The present invention seeks to overcome these problems in the prior art by using a motor with a squirrel cage rotor and end rings with reduced cross section over the outer portion of the rotor and increased cross section over the inner portion of the rotor. Our invention is the first AC induction motor with a squirrel-cage rotor having reduced cross section end rings over the outer portion of the rotor and increased cross section over the inner portion of the rotor. This simple design characteristic gives the motor about ten percent higher starting torque and reduced starting current without negatively affecting the normal, full load operation of the motor.

An electric motor consists of a stator and a rotor mounted on a shaft, which defines an axis of rotation for the rotor. In one embodiment of the invention, a number of laminations of electrical steel is stacked and formed into a stator, and another stack of laminations forms a rotor for the electric motor. Rotor bars are inserted into holes provided in the rotor lamination stack. An end-ring is then placed on either end of the stack, and electrically connected to each of the rotor bars on both ends of the rotor bars. These connections are typically made by brazing the rotor bars to the end rings.

The rotor bars form a double cage, an inner cage nearer the axis of rotation formed by the shaft, and an outer cage nearer the outer diameter, or periphery, of the rotor. The resistance of the rotor circuit is increased by controlling and reducing the thickness of the end rings near the outer periphery, where the end rings complete the electrical circuits formed by the outer cage. The end rings may be thinner entirely, consistent with requirements for mechanical strength, or they may be thinner only in the areas connecting the rotor bars of the outer cage to the end ring. The end rings may be thicker in the area connected to the inner cage, where the inner rotor bars join the end rings and lower resistance is desired.

DESCRIPTION OF THE INVENTION

Figure 1:
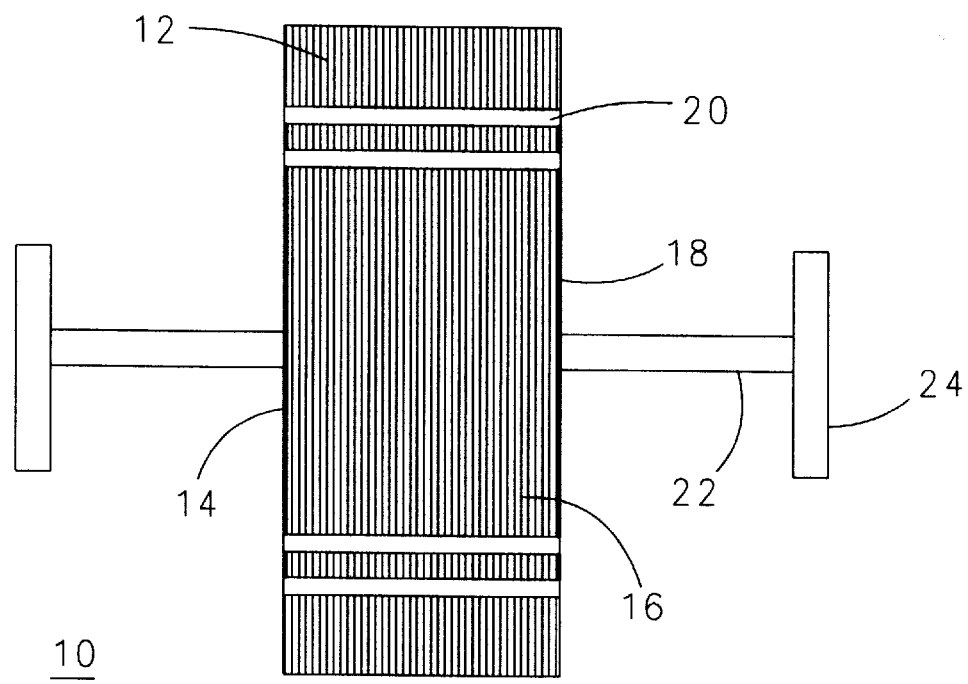
FIG. 1 illustrates a conventional induction motor with a stator and a rotor.
Figure 2:
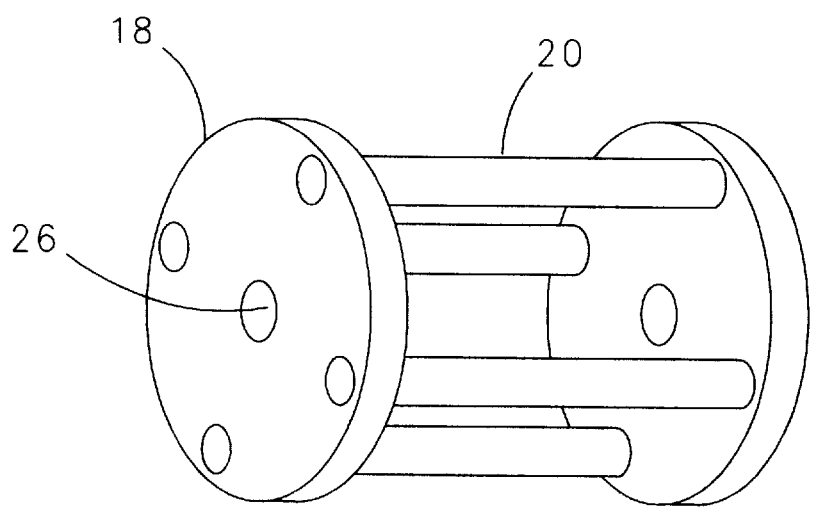
FIG. 2 illustrates the squirrel cage formed as part of the rotor.

When a motor is started, a voltage is induced into the stator, as shown in FIG. 1, which illustrates a motor 10, with a stator 12 and a rotor 14 turning on shaft 22, which forms an axis of rotation. Shaft 22 is mounted on bearings 24. Rotor 14 includes a rotor stack formed of laminations 16, end rings 18 on both ends of the rotor, and rotor bars 20 which extend through the rotor and are electrically connected to the end rings 18. FIG. 2 shows the details of a rotor cage 10 formed by end rings 18 and the rotor bars 20 of circular cross-section. The end rings 18 include openings 26 for a shaft. The rotor bars are connected to the end rings by welding, brazing or other desired means of electrical and mechanical connection. Apertures (not shown) may be provided in the end rings to ease attachment of the rotor bars if desired.

When the motor is started, electric currents are induced in the rotor. In order to obtain high torque upon start up, it is necessary to reduce these rotor currents through increased resistance during start up. Once the motor is running at normal speed, lower resistance is needed for economical operation of the motor. Our invention achieves this result through a double cage construction in combination with end rings of thickness reduced in the areas of the end rings that connect to the outer cage.

Figure 3:
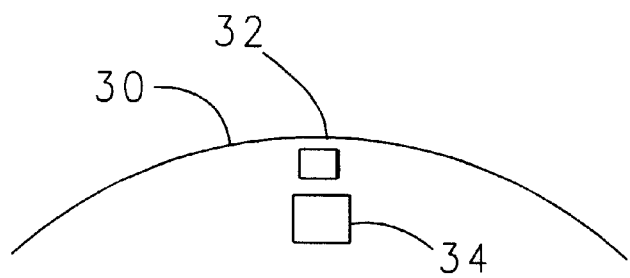
FIG. 3 shows a partial cross-section of a rotor with a double cage construction.

In one embodiment of the invention, a number of laminations are punched, usually of electrical steel, with holes provided for placement of rotor bars as desired. The laminations are then stacked, and may be bonded together, as with an adhesive, or they may be welded together, or they may merely press fit onto a shaft, if holes are also provided for assembly onto a shaft. Rotor bars are then inserted into the holes provided. FIG. 3 depicts a cross-section of a lamination for a double cage construction, in which a smaller hole 32 is provided near the periphery 30 of a lamination, and a larger hole 34 is provided nearer the center of the lamination.

The rotor bars may be made of copper or aluminum, or other material as desired. The rotor bars are brazed or otherwise connected to end rings on both ends of the lamination stack. Normally, the rotor bars are parallel to the rotor shaft, but they may just as well be skewed if desired, depending on the construction of the rotor stack. For practical purposes, the assembler must be able to insert the rotor bars into the assembled stack, and then to weld or braze or otherwise attach the rotor bars electrically to the end rings.

Figure 4:
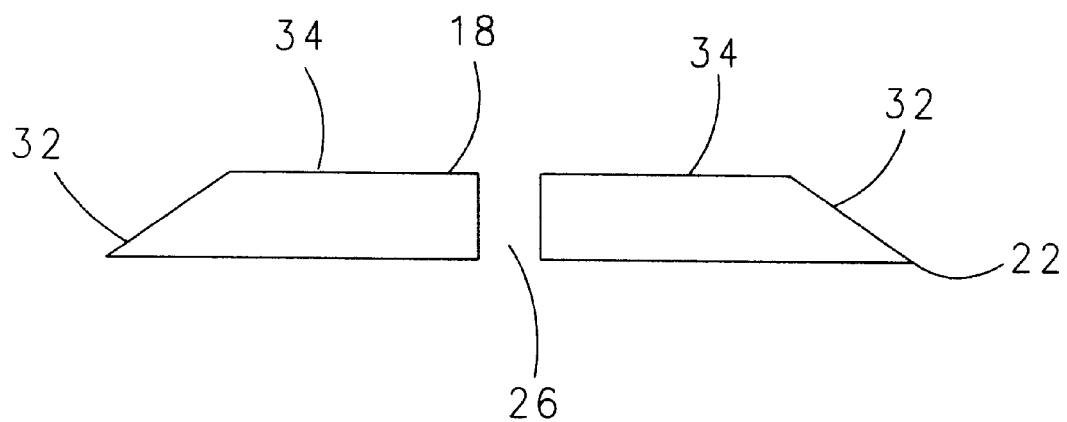
FIG. 4 depicts a partial cross section of an end ring in which the outer periphery is reduced in thickness in the area where an outer cage contacts the end ring, and is not reduced in thickness in the area where an inner cage contacts the end ring.

FIG. 4 depicts an end ring tapered toward its periphery, suitable for attachment to a double cage rotor. The end ring 18 has a center hole 26 for passage of a shaft, and has a reduced cross section 32 near its periphery 22. An area 34 nearer the center of the end ring is not reduced in cross section, so that rotor currents will have little resistance during normal motor operation.

This embodiment of the invention works as follows. Laminations are stacked to form, respectively, a rotor and a stator. The rotor laminations contain apertures for an inner and an outer cage. Rotor bars are inserted into the inner and outer apertures and electrically connected to end rings on both ends of the rotor. In the prior art, separate materials were used for the inner and outer rings. Thus, a material of higher resistance such as brass may be used to form the outer cage, while a material of lower resistance, such as copper, was used to form the inner cage. Upon start up, the skin effect limits rotor currents to the outer cage, thus assuring high resistance and thereby high starting torque for the motor. Once the motor started up, the rotor currents were better able to penetrate into the rotor and use the inner cage of lower resistance. Thus, the motor ran with lower resistance after startup.

Chester A. Tudbury further explains the skin effect in Basics of Induction Heating. Briefly, electricity at high frequency remains in the outer "skin" of its conductor according to a formula which relates skin depth to a constant, 3160, multiplied times the square root of the electrical resistivity divided by the relative magnetic permeability and also divided by the frequency. The formula then is $d = 3160 \cdot \sqrt{\rho/(\mu \cdot \mathrm{freq})}$. This formula is used to calculate the depth of penetration of electric current and to design the end rings to achieve the desired degrees of resistance during startup and during normal operation of the motor.

Figure 5:
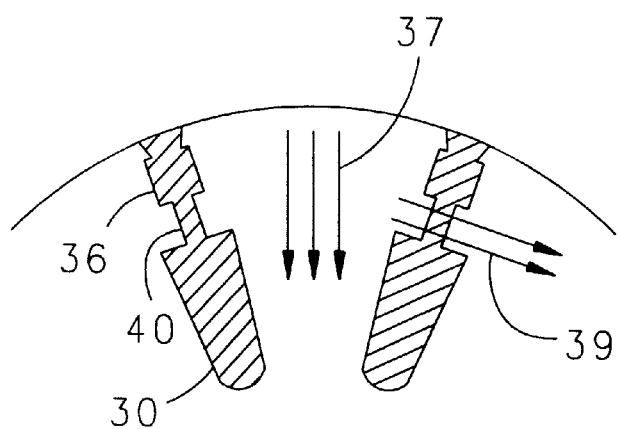
FIG. 5 depicts a partial cross section of a double cage rotor, showing magnetic flux.

FIG. 5 illustrates the magnetic operation of the double cage construction. This partial cross section of a rotor depicts the rotor periphery 30 with a double cage rotor bar arrangement, in which an outer bar 36 of smaller cross section is connected to in inner bar 38 of greater cross section, through a neck 40. Lines of magnetic flux 37 penetrate the magnetic material of the rotor in a useful direction, while leakage flux 39 penetrate to a lesser extent, through the rotor bar.

Figure 6:
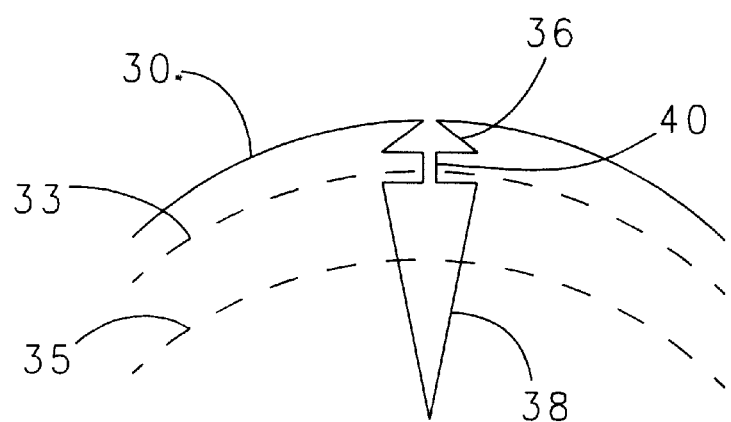
FIG. 6 depicts a partial cross-section of a rotor with a double cage.

FIG. 6 illustrates the skin effect. Rotor currents must flow in the rotor bars, the path of least resistance offered in the rotor. Outer bar 36 is connected to inner bar 38 through neck 40. At start up, when rotor frequency is high, the skin depth limits rotor currents to the bars of the outer cage 36, nearer the periphery 30 of the rotor. The limit of rotor current penetration at some high frequency during startup is depicted by line 33. Upon reaching running speed, the rotor current frequency reduces, according to the slip of the motor, and the skin depth is much greater than before. FIG. 6 depicts the bars of the inner cage 38, now able to conduct rotor currents, since the currents can penetrate the rotor to line 35, the skin depth at low frequency. At this lower frequency, the rotor currents are able to flow in both the inner cage and the outer cage, with less resistance and greater running efficiency for the motor than would be available with merely the outer cage.

Our invention, using the skin effect and tailoring the thickness of the end rings, achieves the desired result without resorting to the expense and trouble of two different types of materials. Rather, our invention uses an end ring with reduced thickness near its periphery where the outer cage connects to the end rings. During startup, the skin effect limits rotor currents to the periphery of the rotor, where the rotor currents are conducted in the outer cage and in the reduced thickness portion of the end rings. The reduced thickness increases the resistance in the circuit, generates high start-up torque, and keeps rotor currents low during startup. Once the motor has started, the skin effect lessens, and the rotor current penetrates further into the rotor, into the inner cage. This inner cage is also connected to the end rings, but in areas of the end ring where the thickness is not reduced or is increased. In this manner, the resistance of the inner cage is not reduced, and the rotor sees much less resistance to rotor currents after the motor is started up.

In another embodiment of the invention, the double cage is achieved by casting. Rather than using numerous individual, discrete rotor bars, a rotor may be "cast," that is, the inner and outer cages may be formed simultaneously by casting molten metal, frequently aluminum, into the holes provided in the rotor stack. This process usually forms the end rings simultaneously with the rotor bars, achieving the desired electrical connection. FIG. 6 depicts one such design, in which an outer rotor bar 36 is formed near the periphery 30 of the rotor. An inner rotor bar 38 is formed at the same time the outer bar 36 is cast.

In another embodiment of the invention, the cages formed by the inner and outer bars may be electrically connected through a neck 40. The neck aids in the casting process, and also adds to the electrical performance of the rotor. One advantage is that the neck area decreases the resistance to magnetic flux while not adding appreciably to the electrical cross section upon startup. This allows for better magnetic performance of the motor while keeping electrical resistance and starting torque high.

Figure 7:
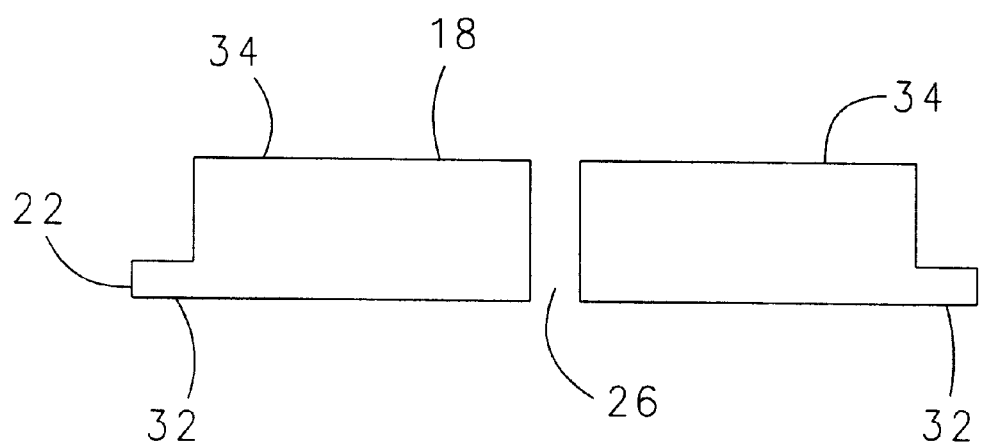
FIG. 7 depicts an end ring with reduced cross section in its outer periphery.
Figure 8:
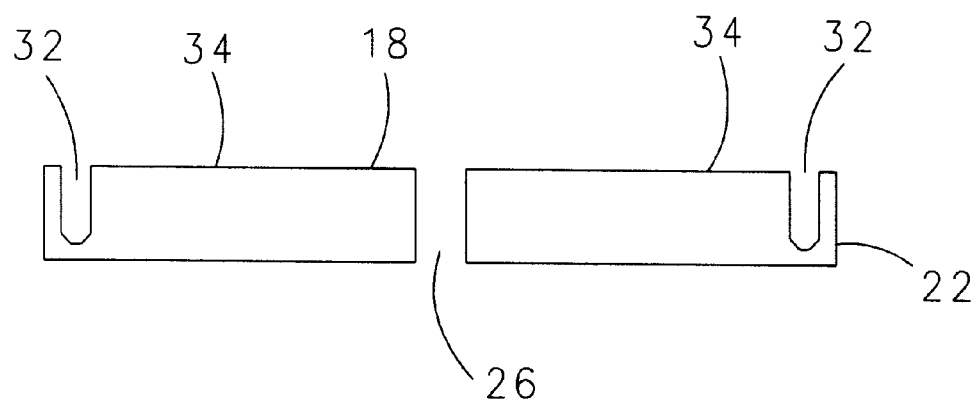
FIG. 8 depicts another end ring with a cross section reduced by trepanning in an area near its outer periphery.

The invention includes end rings that feature increased resistance in the areas contacting the outer cage. In one embodiment of the invention, the end rings are reduced in cross section by tapering, as shown previously in FIG. 4. The thickness of the end rings may also be reduced in other ways, as shown in FIGS. 7, 8, 9 and 10. FIG. 7 depicts an end ring 18 with a step toward its its periphery 22, such that the areas 32 for attachment to the outer cage appear in the thinner section of the end ring, and the areas 34 for the attachment to the inner cage appear in the thicker section of the end ring. FIG. 8 depicts an end ring 18 made by trepanning, in which the area of the end ring which is thinned is toward the periphery 22 of the end ring, and is formed by trepanning in the area where the outer cage is connected to the end ring. The trepanning takes place near 32 toward the outer periphery of the end ring, which is meant for attachment to an outer cage. Areas 34 are of greater thickness and are used to connect the inner cage to the end ring, and hole 26 is provided to accommodate the shaft of the rotor.

End ring configurations, such as tapered, stepped, or trepanned, may be formed by casting the rotors, rather than by machining on cast or wrought rotors. Cast rotors may be more economical than machined, especially if a single material is used for both the rotor bars and the end rings. Thus, in another embodiment of the invention, the rotors are cast and the end rings are formed in desirable shapes incorporating areas of reduced thickness in the areas connecting the end rings to the rotor bars. Those areas may be stepped, tapered or otherwise shaped to reduce the thickness of the end rings in the areas connecting the end rings to the outer cage.

Structural considerations may also dictate the method of assembly. In practicing this invention, the end rings are reduced in cross section at least in the area where the rotor bars contact the end rings. The only limitation in cross-sectional area reduction is that the circuit that consists of rotor bars and end rings can conduct the rotor currents without excessive heat generation and without degrading the performance of the motor. In addition to the electrical considerations, rotors must have mechanical strength and stability to endure their high speeds of rotation. Thus, especially in rotors wherein the rotor bars and end rings are cast, the casting may contribute significantly to the strength of the rotor. Such a rotor must have end rings sufficiently thick to resist disintegration under the forces present when it starts up and when it runs. The mechanical strength is thus an additional consideration in the design of the rotor and in the thickness of the end rings.

Figure 9:
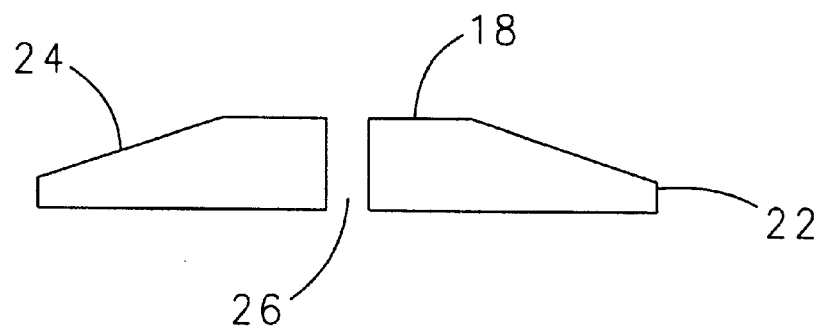
FIG. 9 depicts an end ring with a cross section reduced by stepping down its thickness toward its outer periphery.
Figure 10:
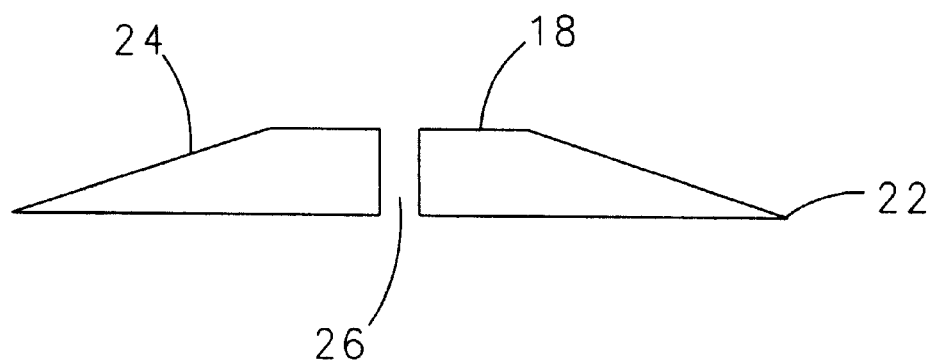
FIG. 10 depicts an end ring of reduced cross section wherein the cross section is reduced only in the area where the rotor bars contact the end ring.

While the above configurations are highly desirable and represent significant improvements of about ten percent greater starting torque over the state of the art, it will be recognized that a double cage motor is a relatively complex device. Our invention may be practiced in a simpler embodiment, in which only a single cage is used. Thus, a motor as previously defined, with a stator and a rotor, may be formed with end rings and rotor bars into a single cage. The end rings are then made with a reduced thickness, or cross-section, in the area where the rotor bars connect to the end rings. FIGS. 9 and 10 show end rings 18 of tapered or reduced cross section near their periphery 22. The end rings have an aperture 26 provided for the rotor shaft, and areas 24 of less thickness for attachment of the rotor bars.

Figure 11:
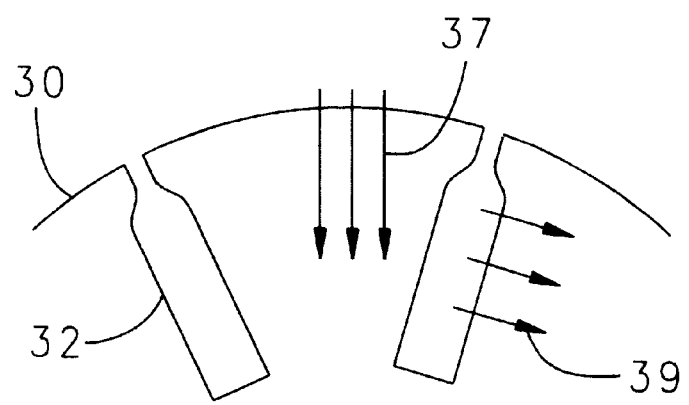
FIG. 11 shows a partial cross-section of a rotor with a "deep bar" style construction.

FIG. 11 shows a rotor using a "deep bar" design. Rotor bars 32 are placed near the periphery 30 of a rotor. The magnetic flux 37 will flow in useful directions, while some leakage flux 39 will escape through the rotor bars. The rotor bars are connected to end rings at both ends, through brazing or welding, or the deep bar designs may be cast as well, along with their end rings. The skin effect will limit rotor currents to the outer portions of the rotor bars during startup, and the outer portions of the rotor bars will conduct to the outer portions of the end rings at both ends of the rotor. After startup, the rotor currents will be able to use more of the rotor bars, and the inner, thicker portion of the end rings to conduct rotor currents.

In another embodiment of the invention, the end rings may be made conventionally, and then reduced in cross section by stepping, tapering, thinning or trepanning the end rings, in the areas where the end rings electrically connect with the rotor bars. In yet another embodiment of the invention, the end rings and rotor bars are cast onto the rotor, and the shape of the end rings is stepped, tapered or otherwise thinned in the areas where the rotor bars connect with the end rings.

Figure 12:
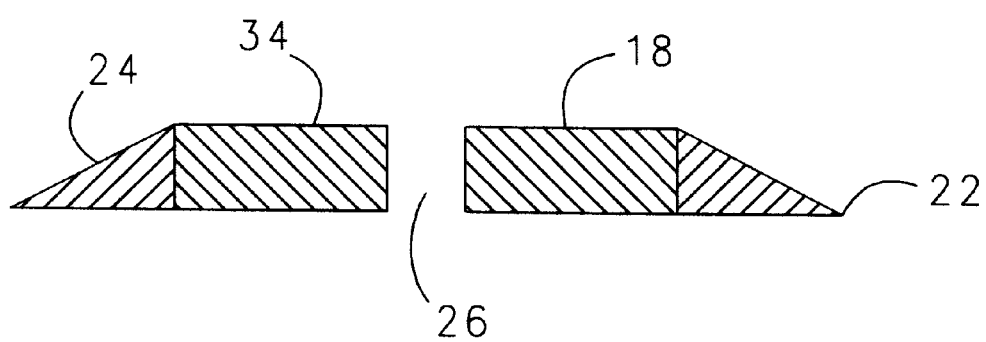
FIG. 12 depicts an end ring made of two materials of different electrical resistance.

In another embodiment of the invention, in a motor with a single cage, the end rings are constructed in such a manner that they have an inner portion and an outer portion, and the outer portion, in the conductive path with the rotor bars, has a higher electrical resistance than the inner portion. The outer portion may be constructed in any of the manners discussed above, by stepping, tapering, thinning or trepanning the outer portion of the end ring. In one embodiment of the invention, the end rings may also be constructed of materials of two different electrical resistivities. For example, an outer portion of brass or aluminum, which have relatively higher resistivities, may be joined to an inner portion of copper, which has a relatively lower resistivity. FIG. 12 illustrates such an end ring 18, which is formed from one material 24 of higher resistivity near its periphery 22, and a second material 34 of lower resistivity nearer its center. An aperture 26 is provided near the center for passage of a rotor shaft. These materials may be joined by welding or brazing, or by a technique such as inertia welding or friction welding. If desired either the outer portion or the inner portion may be formed by casting.

In yet another embodiment of the invention, in which the end rings have inner and outer portions of different electrical resistivities, the rotor bars may form a double cage, with an outer cage nearer the periphery and an inner cage nearer the center of the rotor. The rotor bars of the outer cage are then connected by brazing, welding or other suitable method, to the areas of the end rings nearer its periphery, that is, the areas of higher electrical resistivity. The rotor bars of the inner cage are then connected to the inner portion of the end rings, to form a cage of lower resistivity, useful for low resistance during normal operation of the motor after startup. In another embodiment of the invention, the rotor bars of the outer cage are made from material of higher resistivity of the rotor bars of the inner cage. In another embodiment of the invention, the inner cage and the outer cage are electrically connected.

This invention solves the problem of how to provide a rotor circuit with high resistance upon start-up and low resistance during normal running or operation of a motor. This invention solves the problem without resort to expensive external controls or machinery. It also solves the problem with no additional moving parts, that is, the only part which moves relative to another is the rotor, which rotates in the normal manner with respect to the stator.

The foregoing description of preferred embodiments of the invention has been presented for purposes of illustration and description, and is not intended to be exhaustive or to limit the invention to the precise form disclosed. The description was selected to best explain the principles of the invention and practical applications of these principles to enable others skilled in the art to best utilize the invention in various embodiments and various modifications as are suited to the particular use contemplated. It is intended that the scope of the invention not be limited by the specification, but be defined by the claims set forth below.

I claim:

1. A squirrel-cage motor, comprising, a stator;

a rotor disposed within said stator defining an axis of rotation and two axially facing ends of said rotor;

said rotor also comprising a plurality of axially extending rotor bars circumferentially spaced about said axis;

said rotor further comprising an end ring on each end of said rotor, each end ring having an inner portion and an outer portion, wherein the outer portion has higher electrical resistance than the inner portion, and wherein the end rings are electrically connected to the rotor bars.

2. A motor according to claim 1 wherein the outer portion of the end rings is a material of higher electrical resistance than the inner portion.

3. A motor according to claim 1 wherein the rotor bars form two cages, an inner cage and an outer cage, and the inner cage is electrically connected to the inner portion of the end rings, and the outer portion is connected to the outer portion of the end rings.

4. A motor according to claim 3, wherein the rotor bars of the outer cage are made of material with higher electrical resistance than the inner cage.

5. A motor according to claim 3, wherein the inner cage and the outer cage are electrically connected.

* * * * *